United States Patent [19]
Martelli

[11] 3,916,597
[45] Nov. 4, 1975

[54] PROCESS AND APPARATUS FOR PACKAGING ARTICLES

[75] Inventor: Nerio Martelli, Bologna, Italy

[73] Assignee: Solvay & Cie., Brussels, Belgium

[22] Filed: Apr. 1, 1974

[21] Appl. No.: 456,765

[30] Foreign Application Priority Data
Apr. 6, 1973   France .............................. 73.12593

[52] U.S. Cl. ........................ 53/14; 53/28; 53/134; 53/137; 53/182; 53/384
[51] Int. Cl.² ...................... B65B 9/06; B65B 61/00
[58] Field of Search ......... 53/14, 28, 134, 180, 182, 53/183, 184, 384, 137, 177

[56] References Cited
UNITED STATES PATENTS

| | | | |
|---|---|---|---|
| 2,447,014 | 8/1948 | Irmscher .............................. | 53/28 X |
| 2,655,777 | 10/1953 | Hagen ................................ | 53/182 X |
| 3,338,021 | 8/1967 | Liedtke ............................. | 53/180 X |
| 3,339,337 | 9/1967 | Rapp et al. ......................... | 53/180 |
| 3,550,354 | 12/1970 | Bate .................................. | 53/182 X |

*Primary Examiner*—Robert L. Spruill
*Attorney, Agent, or Firm*—Spencer & Kaye

[57] ABSTRACT

Successive articles to be continuously packaged are deposited on a continuous film placed on a endless belt moving continuously forward and the film is folded so as to wrap up the articles. The successive articles are deposited on the film at a constant spacing by means of a special device which acts until they rest completely on the film. Other devices may be provided for welding and cutting the film at regular spacings between the articles and for applying rigid edgings to the superposed edges of the folded film.

7 Claims, 6 Drawing Figures

PROCESS AND APPARATUS FOR PACKAGING ARTICLES

The present invention relates to a process and an apparatus for packaging articles continuously, in which a continuous film is employed.

It is already known, from German Patent Application No. 1,586,063 filed on Nov. 30, 1967 and published Aug. 28, 1969 in the name of Mr. Ermanno Fabbri, to package articles continuously by means of a continuous strip of film. According to this patent application, the film is unwound onto an endless belt on which it is laid flat and the movement of which it follows. The articles are conveyed by another endless belt in alignment with the first, which deposits them on the film. At the time of deposition, the articles are in an overhanging position until they come into contact with the film. They are then carried along by the film which is folded around them so that the two edges meet again above the packaged articles.

In this type of machine, the operation of transfering the articles by carrying them along on the film is critical. In fact, it depends not only on constant data such as the slip properties of the base of the articles, of the endless feed belt and of the film, but also on random factors such as the weight of the article and its distribution as well as the way in which it is presented. The consequence of this is that the articles to be packaged are not spaced uniformly apart on the film. Consequently, the device for welding and cutting the film, which acts between the articles, cannot be actuated automatically at constant and regular intervals. It is necessary to use a device, the operation of which is triggered every time, at uneven intervals, according to the signal received, for example, from a probe or from a photoelectric cell. The result of this requirement is that the machines become more complex and consequently much more expensive to construct and to maintain, and break down much more frequently.

SUMMARY OF THE INVENTION

There has now been developed, in accordance with the present invention, a process and an apparatus which overcome this disadvantage.

The present invention thus relates to a process for packaging articles continuously by means of a continuous film, in which the film is placed on an endless belt moving continuously forwards, the articles are deposited successively on the film and the film is folded so as to wrap up the articles. The process is characterized in that the articles are carried along by a special device which acts until they rest completely on the film and in that the folded edges of the film are gripped by movable gripping means which maintain the edges separated and move them at substantially the same speed as that of the endless belt.

The present invention also relates to an apparatus for packaging articles continuously by means of a continuous film, comprising an endless belt moving continuously forwards, a device for placing a continuous film on the endless belt and a device for depositing the articles successively on the film carried by the endless belt. This apparatus is characterized in that it also comprises a special device for carrying the articles along, which acts until they rest completely on the film and in that the folded edges are gripped by movable gripping means which separate the folded edges and move them at substantially the same speed as that of the endless belt.

DETAILED DESCRIPTION OF THE INVENTION

Other characteristics of the invention will become apparent from the description of particular embodiments which now follows. This description is illustrated by the following figures.

Figure 1:
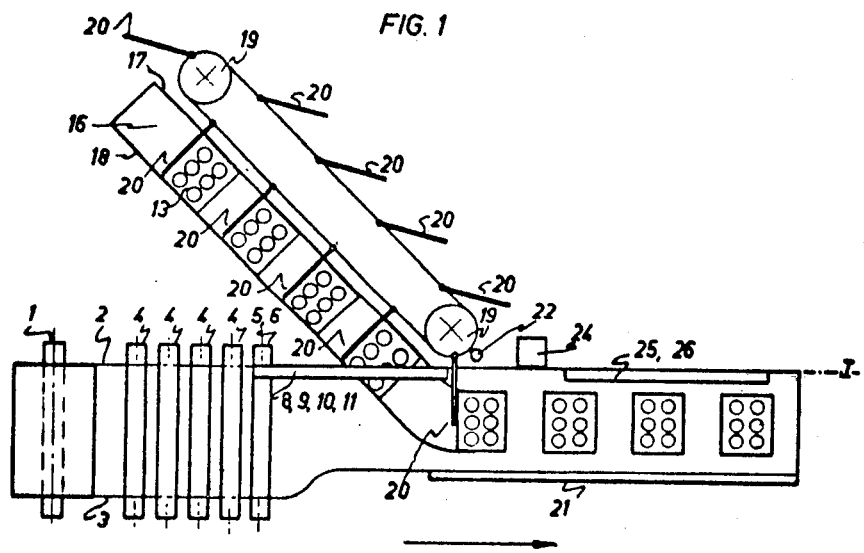
FIG. 1 is a diagrammatic plan view of an apparatus according to the invention.

FIG. 1 is a diagrammatic representation of an apparatus according to the invention. According to the embodiment considered, the starting point is a continuous film supplied from the roll support beam 1. This film 2 is folded longitudinally along its median line 3 and the two folded parts are superposed so that the edges opposite the line 3 practically coincide.

According to an equivalent embodiment, which is not represented, it would have been possible to use a continuous non-folded film wound up on a beam. It would then have been necessary to equip the apparatus with a device for folding the film longitudinally about its median line.

The invention can be carried out by employing any sheet packaging material whatsoever in the form of a continuous strip which is sufficiently flexible to be wound up. It is however preferred to use plastic films or laminated materials based on such films. Among the plastics of which these films can be made, there may be mentioned vinyl resins such as polymers based on vinyl chloride, acrylic resins such as polymers based on acrylonitrile or methyl acrylate, polyolefines such as polyethylene and polypropylene, thermoplastic polyesters and polyamides. Most of these polymers lead to films which are transparent at the usual thicknesses (less than 1 mm). However, it is also possible to use thicker films such as cellular films which are not transparent. Very good results are obtained with plastic films which have been stretched in at least one direction at a temperature at which the crystallites become oriented. These films can be shrunk by heating them again at the temperature at which they were stretched. They are usually based on non-plasticized polyvinyl chloride or on a crystalline polyolefine (high density polyethylene or isotactic polypropylene).

Figure 2:
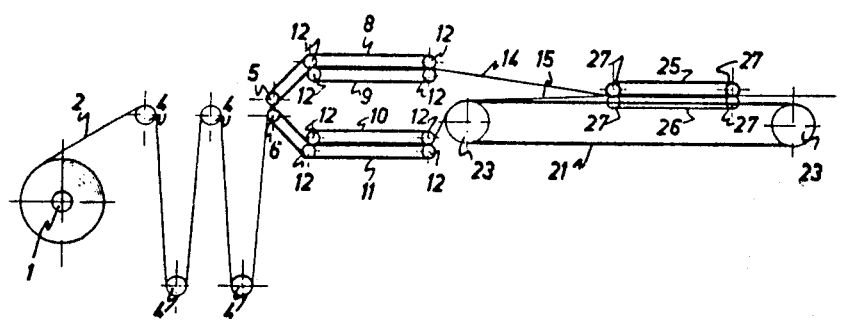
FIG. 2 is a diagrammatic front representation of a system fro guiding the film and carrying it along, which is applicable in the invention.
Figure 3:
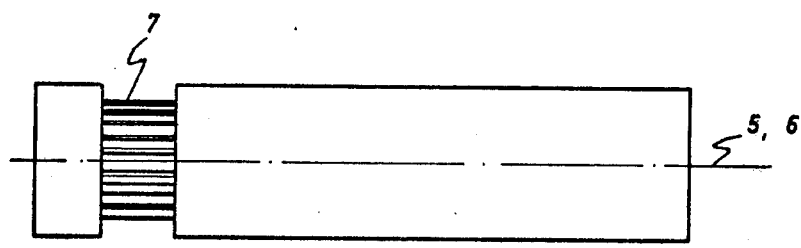
FIG. 3 is a diagrammatic representation in profile of the rollers which supply the film.

After having left the roll support beam 1, the film 2 passes over a series of stretching rollers 4, the function of which is to take out the creases in the film and to make it completely flat. These stretching rollers 4 can be seen clearly in FIG. 2 which represents diagrammatically the system for guiding the film and carrying it along at the level of the line I of FIG. 1; in order to make the illustration clear, only the devices for supplying the film and for carrying along the film and its edges have been represented. After being passed over the stretching rollers 4, the film passes between two feed rollers 5 and 6. Each of these rollers 5 and 6 has the shape represented diagrammatically in FIG. 3. At the end corresponding to the superposed edges of the film, the cylinders are provided with a groove 7 intended to receive an endless belt of which the face in contact with the bottom of the groove is notched and the thickness is such that the opposite face, which is smooth, comes to approximately the same level as the body of the roller. The bottom of the groove is also notched and cooperates with the endless belt. The body of the roller is made from an elastic material.

The device for separating the edges of the film comprises four notched endless belts 8, 9, 10 and 11. These belts are guided by idling wheels 12, which are also notched. At the level of this device, the film is held only by its edges, by means of the belts.

Of course, any device for separating the edges which is equivalent to the device illustrated using belts can be employed. By way of example of an equivalent device, there may be mentioned a device comprising two endless chains turning about two notched wheels with a vertical axis which are equipped with clips controlled so as to grip each edge of the film. It would also be possible to separate the edges of the film by means of two fixed guides. However, it is preferred to use devices, like that illustrated, wherein the edges of the film are gripped and carried along by the gripping means.

When the edges of the film are separated, the articles to be packaged 13 are brought into the space between the two folded parts 14 and 15 of the film. The articles illustrated are cellular plates made of expanded polystyrene containing six spherical pieces of fruit. The articles slide on the track 16 which is fixed and horizontal and which is covered with a material with a very high coefficient of slip. This sliding track has an incurvated shape so as to cause the articles to follow an incurvated path tangential to the direction of forward movement of the endless belt. The track is equipped with two fixed guides 17 and 18 intended to keep the articles on their path. The inner guide 17 stops at the end of the track. The outer guide 18 extends so as to guide the middle part of the film and to prevent it from coming into contact with the articles to be packaged before the latter rest completely on the film. As can be seen, the final part of the track is inserted between the two folded parts of the film.

It would also have been possible to incline the track so as to facilitate the forward movement of the articles, or to use a roller track or any other equivalent device.

The essential aspect of the invention resides in the fact that the articles to be packaged are carried along by a special device which acts until they rest completely on the film. In the embodiment illustrated, this conveying movement is effected by means of a device with an endless chain turning about two cogwheels 19. The chain is equipped with fingers 20 which are spaced evenly apart by the same distance as the articles to be packaged on the film. These fingers push the articles to be packaged and exert their effect for as long as the bases of the articles are not in complete surface contact with the film while the latter is supported by the endless belt 21. Thereafter, the fingers are retracted by rotation about their point of attachment to the chain by means of the fixed guide 22. It is of course advisable that the force exerted by the spring holding the fingers in a position orthogonal to the chain should be sufficient to cause the articles to be packaged to move forwards. A further function of this device is to space the articles to be packaged evenly apart before they are deposited on the film.

Of course, many other devices exist which can carry out the functions of the sliding track and of the chain with fingers illustrated. Thus it would be possible to use a device of the merry-go-round type comprising retractable clips or forks which bring the articles to be packaged onto the film.

The endless belt 21 intended to support the film and the articles to be packaged turns about two rollers 23. It can be supported by other intermediate rollers which are not represented. The end of the sliding track 16 is designed so as to be at the same level as the belt and to leave a very small distance between the track and the belt.

By means of the device 24, the internal face of the lower edge 15 of the film is provided with an adhesive. The two edges are then brought back into contact by means of the two notched endless belts 25 and 26 turning about notched wheels 27. The pressure exerted by these belts on the edges of the film can be increased by providing small wheels pressing against the belts.

According to the invention, the articles to be packaged are carried along, not by the film itself but by a special device which acts while they do not rest completely on the film. Optimum functioning is achieved when the speed at which the articles are carried along by the special device is equal to the speed of the endless belt 21 at the moment when the articles are deposited on the film. To achieve this, it is necessary for the speed imparted to the articles 13 at the end of the sliding track to be equal to that of the endless belt. The articles are thus deposited on the film without there being any relative movement of the article with respect to the film. Consequently, the articles stay the same distance apart as they were originally, are positioned in the same way and are not damaged by impacts. Moreover, the process and the apparatus of the invention possess all the advantages of machines which function continuously compared with machines which function intermittently and which are most widespread in the prior art.

Finally, due to the invention, the speed of forward movement of the film can be very high: in general, it is greater than 15 m/minute and most frequently is of the order of 18 m/minute. Because of this, the apparatuses according to the invention have an extremely high hourly production for a very low overall size and very low capital investment and operating costs.

In order to achieve the best possible functioning of the machine illustrated in FIG. 1, it is advisable to match the speed of the endless belt 21 not only with that of the chain with fingers 18 but also with that of the device for separating the edges of the film, in the present case the notched belts 8, 9, 10 and 11, as well as with the speed of the device for joining the edges together again, in the present case the notched belts 25 and 26. To achieve this, it suffices for the feed rollers 5 and 6, as well as some of the rollers 12 and 27, to be driven with suitable rotational speeds. The simplest embodiment consists of bringing about all the movements by means of a single motor, for example an electric motor, optinally connected to one or more speed-variation devices, and to effect the transmission to the various drive components by means which ensure the constancy of the speed ratios, such as gears and chains.

Various devices belonging to the state of the art can complete the machine illustrated in FIG. 1.

For the majority of their uses, the articles packaged according to the process of the invention must be separated and must be contained in perfectly sealed individual packages. It is thus advisable to separate the packaged articles by cutting the film transversely right through and by welding the two folded parts transversely on either side of the cut.

Figure 4:
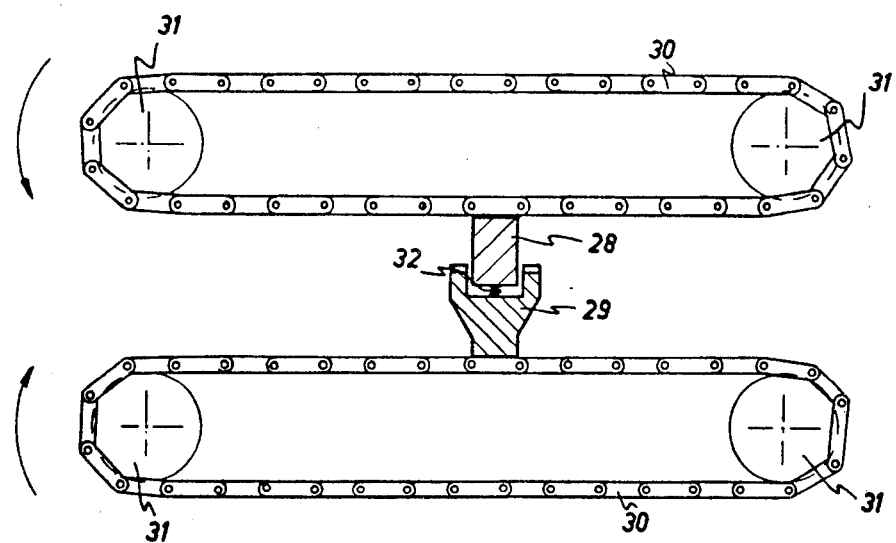
FIG. 4 is a diagrammatic cross-sectional representation from the front of a device for separating and effecting the transverse welding of the packages produced.

A device for separating and welding the packages is illustrated in FIG. 4 which represents diagrammatically a front cross-sectional view of such a device. This device is placed against the outlet of the endless belt 21 and consists of two transverse bars 28 and 29, each of which is firmly fixed to two chains 30 mounted on either side of the machine and turning about cogwheels 31. The upper bar 28 is of prismatic shape and becomes imbricated with the lower bar 29. The upper bar possesses a filiform heating resistance element 32. The length of the chains 30 and the position of the bars 28 and 29 are such that the bars come into coincidence between each article. By becoming imbricated with one another, the bars stretch the film which is cut and welded on either side of the cut by the hot wire 32. The speed at which the chains move is such that the bars travel at the same speed as the film. According to a preferential embodiment, the chains are actuated by the single motor which was mentioned above.

The separating and welding device described above functions continuously, like the rest of the machine, and perfectly synchronously with it. This was not possible in the machines of the prior art because these machines did not make it possible to space the articles evenly apart. The invention thus makes it possible considerably to simplify the drive mechanism of the device and to dispense with its control components, and this makes it much less expensive and much less fragile.

At the outlet of the separating and welding device, the packaged articles can be taken up again by another endless conveyor belt. The speed of forward movement of this conveyor belt is preferably slightly greater than the speed of forward movement of the film in the machine. Consequently, the packaged articles are at a greater distance from one another. The entrance of the conveyer belt is placed very close to the separating and welding device; the tension of the film in this device is thus improved.

If a heat-shrinkable film is employed and if it is desired to immobilize the packaged articles by means of the film, it is possible to cause the film to shrink by passing the packaged articles through a tunnel heated to a sufficient temperature for a few seconds. The conveyor belt can be used for this purpose. At the outlet of the tunnel, the packaged articles are ready to be dispatched for sale.

The machine illustrated in FIG. 1 can also be equipped with a device which makes it possible to apply rigid edgings to the superposed edges 14 and 15, and this forms a particularly valuable aspect of the invention. This device is illustrated diagrammatically in FIG. 5 where it is represented in front view, and in FIG. 6 where it is represented in plan view. The device illustrated is suitable for applying double edgings which can be printed on their outer face, which are folded about their median line and which grip the edges of the film. These are individual edgings for each packaged article.

The device comprises a drum 33 equipped over its entire circumference with two rows of vent holes which are not represented. The pre-cut and pre-printed edgings are placed in a magazine 34 with their printed face downwards. A uniform alternating movement is imparted to the magazine, which causes it to present each edging successively by one of its ends and to apply it to the drum 33. The edgings, with their internal face on top, pass under the gluing tank 35. The latter preferably contains an adhesive of the "hot-melt" type kept, by means of a thermostat and a heating resistance element, at the temperature at which it is active. At its lower part, the gluing tank possesses three balls 36 positioned in spherical seats which spread the adhesive in three strips over the internal face of the edgings. Between the periods when edgings are passing, the gluing tank 35 is raised. The funtion of the outer strips of glue 37 and 38 is to glue the edging to the edges 14 and 15 of the film. The film is positioned on the machine in such a way that its edges 14 and 15 end between the two strips of glue 38 and 39. The function of the strip of glue 39 is to glue the two parts of the internal face of the edging to one another and thus to close the edging.

After passing under the gluing tank and half way round the drum 33, the edgings are applied by pressure between the drum 33 and the notched endless belt 40 to the outside of the upper edge 14 of the film. The notched belt 40 turns on notched wheels 41; it is also provided with small pressure wheels 42. The gluing is completed by means of the notched endless belt 43 turning about notched wheels 44, equipped with small pressure wheels 45 and cooperating with the notched belt 40.

The edgings are then folded over about their median line by means of a fixed guide 46, the surface of which cannot be developed and the function of which is to bring the part of the edging which is not fixed to the film against the lower edge 15 of the film. The gluing to the lower edge and the gluing of the two parts of the edging to one another are completed by the pressure exerted by the notched endless belt 47 turning about the notched wheels 48, equipped with small pressure wheels 49 and cooperating with the notched belt 43.

Figure 5:
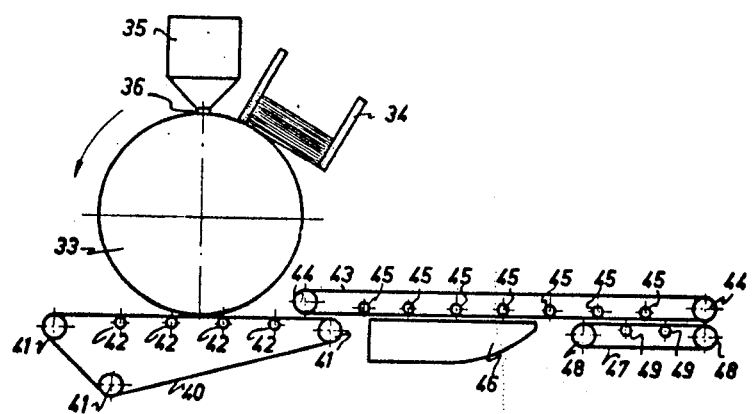
FIG. 5 is a diagrammatic front representation of a device for applying a rigid edging to the edges of the film.
Figure 6:
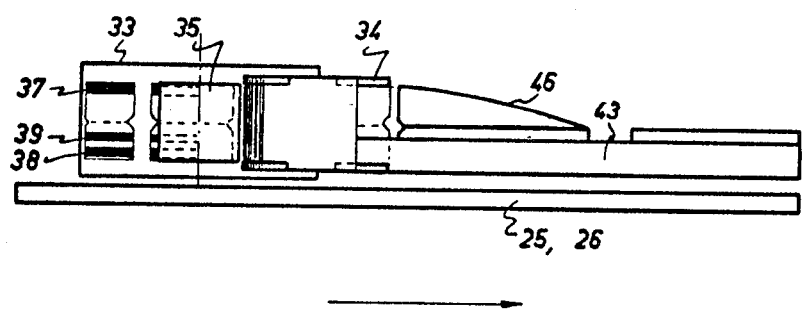
FIG. 6 is a diagrammatic plan representation of a device for applying a rigid edging to the edges of the film.

The device illustrated in FIGS. 5 and 6 is mounted on the machine illustrated in FIG. 1 at the level of the notched belts 25 and 26. The latter can then be dispensed with. Nevertheless, it is preferred to retain them, making them act a little further away from the edges of the film, as is represented in FIG. 6. In contrast, the device 24 for dispensing adhesive can be eliminated since the two edges of the film are held against one another by the edging.

It is very obvious that the device illustrated in FIGS. 5 and 6 can be adapted readily to apply edgings of another type, for example single edgings.

The device illustrated in FIGS. 5 and 6 functions continuously, just like the entire machine. The rotational speed of the drum is adjusted so that the tangential speed at the circumference is equal to the speed of forward movement of the film. The same applies to the speed of the notched belts 40, 43 and 47. According to a very advantageous embodiment, the drum 33 and the belts 40, 43 and 47 are actuated by the single motor which was mentioned above.

Of course, it is advisable for the edgings to be positioned suitably relative to the packaged articles. In the machines of the prior art, it had been necessary to equip the system for dispensing edgings with a control of its own triggering the supply of the edging according to the position of the articles. In the machines according to the invention, this is no longer necessary since the articles to be packaged are spaced evenly apart. Consequently, the edgings can be supplied at constant time intervals by the magazine 34. The movement of the latter, like that of the gluing tank 35, can be automatic and synchronous with all the movements of the machine.

The articles which are packaged under film and are equipped with an edging are particularly valuable. In effect, the edging can be used to give various pieces of information (nature, weight, price, source) relating to the packaged articles. It can also be pierced with an orifice allowing it to be used as a handle, or with one or more holes which make it possible to slip the packages over horizontal rods, which facilitates transport and presentation for sale.

The invention has been described with reference to an embodiment wherein the continuous film is folded longitudinally along its median line. Of course, the invention is also applicable to many other embodiments. Thus, without going outside the scope of the invention, a non-folded continuous film which is made to move forwards on an endless belt can be employed. The articles to be packaged are then deposited on the middle part of the film according to the invention, and the edges are folded over above the articles and are welded.

The invention can be used for the automatic packaging of a very large number of articles which may or may not be placed on a plate. It is particularly suitable for articles which are sold in sets, such as fruits, bottles, rolls of paper, boxes of preserved food, crockery, cakes, sweets and household products in self-service stores. It is also particularly suitable for articles which do not have a constant and uniform shape such as cuts of meat.

I claim:

1. Apparatus for packaging articles continuously comprising:
   a. an endless belt for continuously moving forward a film of plastic material folded longitudinally along its median line and having first and second longitudinal edges opposite the median line;
   b. gripping and spacing means for maintaining separated the edges of the film, comprising a first movable gripper for gripping the first edge of the folded film and a second movable gripper for gripping the second edge of the folded film, said first and second grippers maintaining the gripped edges of the film spaced apart from one another while moving the gripped edges at a speed substantially equal to that of the endless belt;
   c. feed means for depositing the articles to be packaged onto the folded film comprising a sliding track for guiding the articles to be packaged along a trajectory tangential to the direction of advancement of said folded film and an endless chain provided with regularly spaced entrainment fingers for moving the articles forward on the sliding track until the moment when the articles are deposited by the sliding track onto a fold of the folded film supported by the endless belt;
   d. two endless belts which are superposed and disposed on opposite sides of the trajectory of the folded film to place the two edges of the folded film in edge-to-edge contact and to join them together; and
   e. finishing means comprising means for transversely cutting the folded film between the articles spaced apart on the film and simultaneously transversely welding the film on both sides of the cut to form spaced rectangular bags each enclosing an article.

2. Apparatus for packaging articles continuously comprising in series:
   a. a first endless belt for continuously moving forward a film of plastic material folded longitudinally along its median line and having first and second longitudinal edges opposite the median line;
   b. spacing means for maintaining separated the edges of the film, comprising two groups of movable endless belts, each group containing two belts for gripping an edge of the folded film between its two belts and maintaining the gripped edges of the film spaced apart from one another while moving the gripped edges at a speed substantially equal to that of the first endless belt;
   c. feed means for depositing the articles to be packaged onto the folded film comprising a sliding track for guiding the articles to be packaged along a trajectory tangential to the direction of advancement of said folded film and an endless chain provided with regularly spaced entrainment fingers for moving the articles forward on the sliding track until the moment when the articles are deposited by the sliding track onto a fold of the folded film supported by the first endless belt;
   d. two endless belts which are superposed and disposed on opposite sides of the trajectory of the folded film to place the two edges of the folded film in edge-to-edge contact and to join them together; and
   e. finishing means comprising means for transversely cutting the folded film between the articles spaced apart on the film and simultaneously transversely welding the film on both sides of the cut to form spaced rectangular bags each enclosing an article.

3. Apparatus according to claim 2 further comprising a rotatable drum for receiving successive rigid edgings disposed in a magazine, means for applying glue to these rigid edgings, said drum bringing each of the glue-coated rigid edgings to one of the sides of one of said spaced-apart bags and pressing each rigid edging to one of the edges of one of the bags.

4. Apparatus according to claim 3 including means to fold said rigid edgings about their median line after they have been applied to one of the edges of one of the bags.

5. Apparatus according to claim 4 including means to press the folded part of the rigid edgings to the other edge of the bag.

6. Process for packaging articles continuously comprising:
   a. continuously moving forward on an endless belt a film of plastic material folded longitudinally along its median line and having first and second longitudinal edges opposite the median line;

b. maintaining the edges of the film separated by gripping each edge of the folded film and moving the separated and gripped edges of the film at a speed substantially equal to that of the endless belt;

c. feeding the articles to be packaged onto the folded film by a sliding track which uniformly spaces the articles apart and guides the articles along a trajectory tangential to the direction of advancement of said folded film;

d. moving the articles on the sliding track at the same speed as the endless belt until the moment when the articles are deposited by the sliding track between the two folds of the film and onto a fold of the folded film supported by the endless belt;

e. placing in edge-to-edge contact the two edges of the folded film and joining them together after the articles have been deposited on the film; and f. transversely cutting the folded film between the articles spaced apart on the film and simultaneously transversely welding the film on both sides of the cut to form spaced rectangular bags each enclosing an article.

7. Process according to claim 6 wherein a rotatable drum receives successive rigid edgings disposed in a magazine, glue is applied to these edgings on the drum, and each of the glue-coated rigid edgings is brought by the drum to one of the sides of one said spaced-apart bags and pressed by the drum onto one of the edges of one of the bags.

* * * * *